March 16, 1943.　　　R. K. MARTIN　　　2,313,831
DISPLAY DEVICE
Filed Sept. 19, 1940　　　2 Sheets-Sheet 1
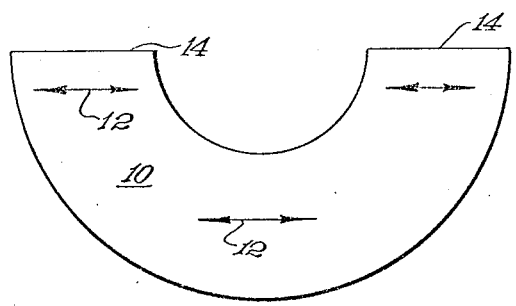
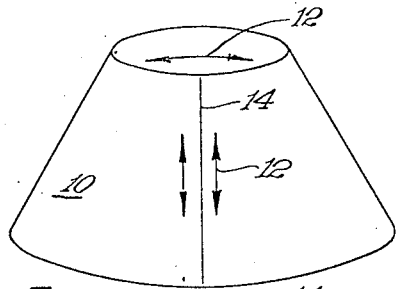
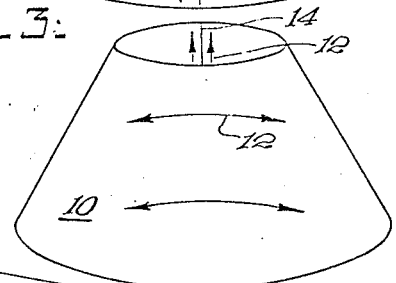
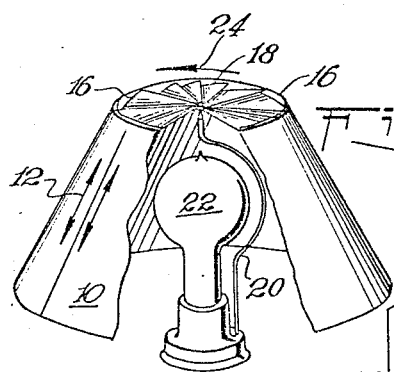
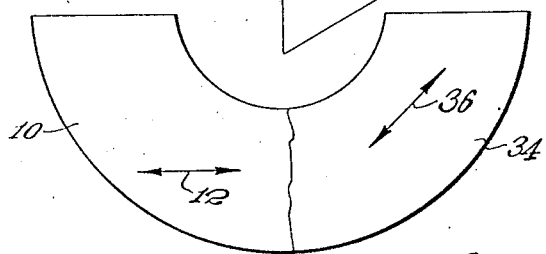
INVENTOR
Randolph K. Martin
BY
Donald L. Brown
ATTORNEY

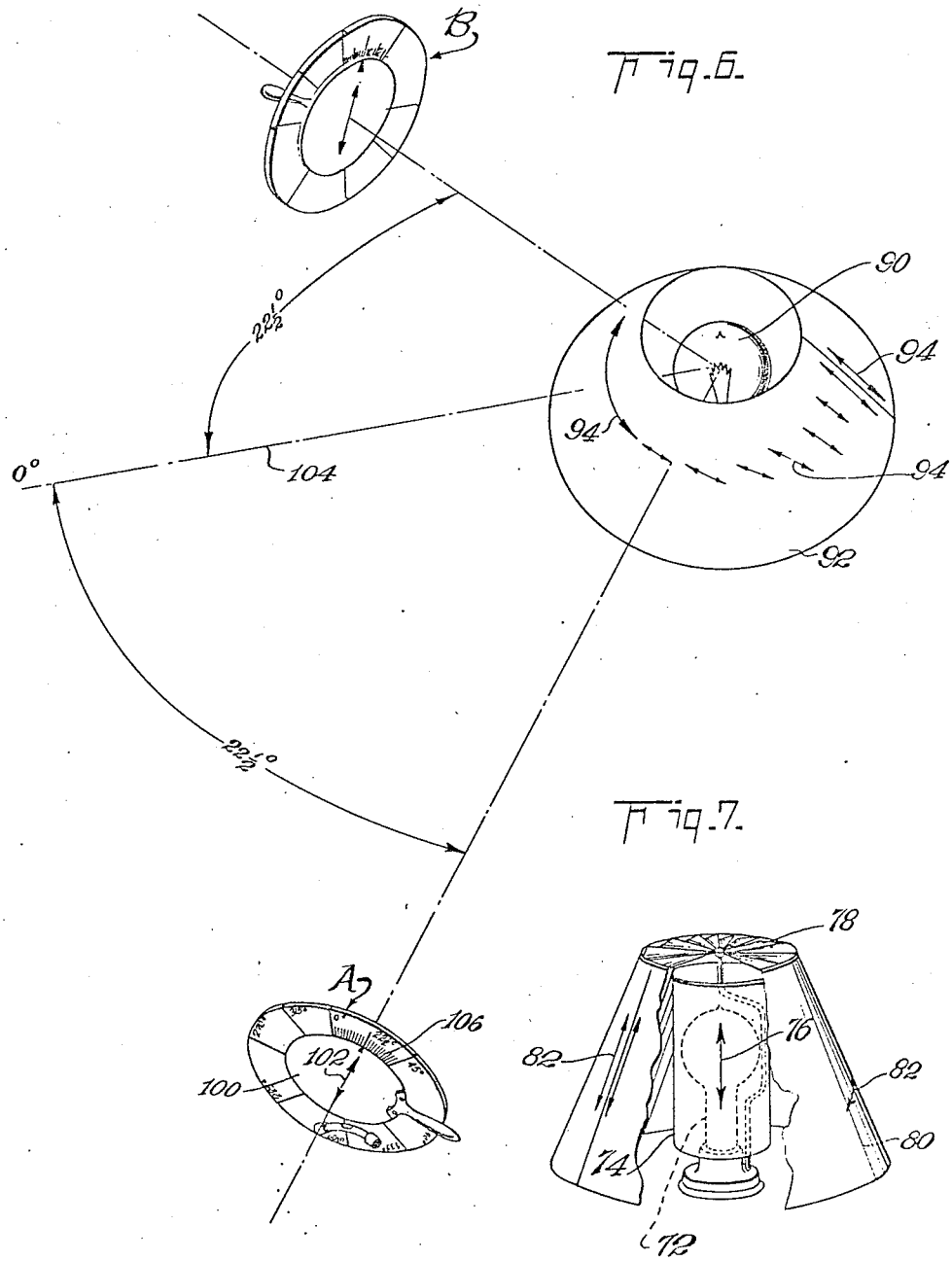

Patented Mar. 16, 1943

2,313,831

UNITED STATES PATENT OFFICE 2,313,831

DISPLAY DEVICE

Randolph K. Martin, Cambridge, Mass., assignor to Polaroid Corporation, Dover, Del., a corporation of Delaware Application September 19, 1940, Serial No. 357,442

7 Claims. (Cl. 88—65)

This invention relates to a new display device, and more specifically to a display device employing light-polarizing elements.

An object of the invention is to provide, in a display device of the character described, a light source and means to so polarize the light emanating therefrom that the direction of vibration of light propagated in any direction from the source differs from that propagated in other directions, and to provide means whereby the vibration-direction of light propagated from the source is constantly changing during the operation of the device.

A still further object of the invention is to provide, in connection with means for changing the direction of vibration of light emanating from a source, birefringent means which may take the form of a birefringent design, and supplemental light-polarizing means, the birefringent means being positioned between the light source and the supplemental polarizing means.

A still further object of the invention is to provide a display device of the character described employing a plurality of light-polarizing elements, one of which is movable with respect to the other, and to provide in connection therewith heat rotor means for effecting movement of the movable polarizing element.

A still further object of the invention is to provide, in devices of the character described, a polarizing element in the form of a truncated cone, and more specifically in the form of a truncated cone made from a sheet of light-polarizing material shaped in the form of a semi-annulus.

A still further object of the invention is to provide a blank for use in the formation of an element in a display device of the character described, the blank being in the shape of a segment of an annulus, and more specifically in the shape of a semi-annulus and being formed of light-polarizing material.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Figure 1 is a plan view of a blank formed from light-polarizing material and adapted for use in the present invention;

Fig. 2 is a perspective view of the frusto-conical shield or shade formed from the blank shown in Fig. 1;

Fig. 3 is a perspective view of the device shown in Fig. 2 but viewed from a different position;

Fig. 4 is a diagrammatic view of an assemblage of the elements comprising the display device of the present invention, certain of the elements being shown broken away;

Fig. 5 is a view similar to Fig. 1 of a blank for use in the present invention formed from a composite of a polarizing sheet and a birefringent sheet;

Fig. 6 is a diagrammatic view of a device embodying a modification of the invention, and of apparatus for use in connection therewith; and Fig. 7 is a perspective view, with parts broken away, of a modification of certain of the elements shown in Fig. 4.

In Patent No. 2,018,214, dated October 22, 1935, there is disclosed a display device comprising a plurality of light-polarizing elements having positioned therebetween a birefringent element and means to position the two polarizing elements and the birefringent element in the path of a light beam so that the color characteristics of the beam are altered. It is pointed out in that patent that rotation of either of the light-polarizing elements or of the birefringent element results in a shifting or changing of the color characteristics of the transmitted beam, and means are shown for effecting this result.

This invention relates primarily to a modified form of apparatus embodying generally the principles disclosed in said issued Letters Patent. In the present invention, motion is imparted to one of the polarizing elements or to a polarizing element and a birefringent element, or to only a birefringent element, by utilizing heat emanating from the light source, through a standard form of heat rotor device. The moving polarizing element, i. e., the element associated with the heat rotor, is so designed that the direction of vibration of light emanating from the source is progressively altered as it is transmitted by the rotating polarizing element.

In the preferred embodiment of the invention the rotating polarizing element associated with the heat rotor has the shape of a truncated equilateral cone, and is preferably formed by cutting from a sheet of light-polarizing material a blank in the form of a semi-annulus. This blank is then shaped into the desired frusto-conical form and affixed to vanes of the type generally employed in connection with heat rotors.

In Fig. 1, there is shown a blank 10 cut from a sheet of light-polarizing material, for example a sheet of material of the type now made and sold under the trade name "Polaroid." This material comprises a suspension of minute optically oriented polarizing crystals in a set or hardened plastic, such for example as cellulose acetate or a vinyl resin or the like. The arrows 12 may be understood as illustrating the direction of the orientation of the polarizing particles within the sheet, and may hence be taken as illustrative of the direction of the polarizing axis of the material from which the blank is formed. As shown in Fig. 1, the blank is preferably in the shape of a semi-annulus.

In Figs. 2 and 3 the blank of Fig. 1 is shown shaped to form a screen or shade for use in connection with a light source and heat rotor in the manner heretofore to be described. In Fig. 2 the frusto-conical shade formed by joining the edges 14 of the blank 10 is shown as viewed from a position adjacent the joined edges, and in Fig. 3 the same shade or shield is shown as viewed from a position adjacent that side of the shield farthest removed from the joined edges 14 of the blank 10.

As will be noted from an examination of Fig. 1, the orientation of the polarizing axes of the particles in the sheet from which the blank is cut is indicated to be substantially parallel to the edges 14. When the blank is folded, as shown in Figs. 2 and 3, the direction of orientation of the crystals within the plastic is such as is illustrated by the arrows 12 in those figures. Near the seam 14 the direction of orientation lying within the surface of the sheet is parallel to the seam, and hence parallel to a line extending from the apex of the cone to the base thereof along the seam formed by joining the edges 14. Departure from the seam 14 in either direction results in an alteration of the direction of orientation of the needle or polarizing axes of the crystals within the sheet with respect to lines drawn from the apex to the base of the cone in the surface thereof. As is shown in Fig. 3, for example, in the surface of the conical section formed by the blank 10 which is farthest removed from the seam 14, the orientation of the polarizing axes of the crystals within the sheet is at 90° to a line extending from the apex to the base of the cone in the surface thereof.

As a result of this property of a conical section formed from the blank 10, it will be apparent that rotation of the screen or shield shown in Figs. 2 and 3 about a light source will result in a gradual alteration of the direction of vibration of light emanating from the source and propagated in any predetermined direction, and with each complete rotation of the screen or shield shown in Fig. 2 about the light source there will be a rotation of the direction of vibration of the beam emitted therefrom through an angle of 180°.

It will furthermore be apparent that where the shape of the blank forming the conical section shown in Figs. 2 and 3 is that of a semi-annulus, the change in the direction of vibration of the transmitted beam will be constant and progressive. If the shape of the blank differs from that of a semi-annulus, there will be a sharp and noticeable alteration in the direction of vibration of the transmitted beam in the neighborhood of the seam formed by joining the edges 14 of the blank. It is to be understood that while various forms of blanks are to be deemed within the scope of this invention, the preferred form is one having the shape of a semi-annulus, as previously described.

In Fig. 4 there is shown an assemblage of elements diagrammatically representative of a display device embodying the present invention Here 10 again represents the shield or screen formed from the blank previously described. At its upper end it may be provided with vanes 16 of the usual heat rotor type having at their centers a bearing 18 adapted for engagement with a support 20 centrally positioned above a light source such for example as an incandescent bulb 22. The heat of the light source creates a rising current of air which passes through the vanes 16, causing rotation of the entire screen or shield 10 about the light source in the direction shown, for example, by the arrow 24.

Between the light source and an observer there may be a birefringent screen 26 adapted to intercept rays emanating from the source and traversing the element 10, and this birefringent screen may, if desired, be provided with any suitable design, indicia or picture shown generally as at 28 and formed of birefringent material having different optical properties from that forming the remainder of the sheet 26. It is of course to be understood that the elements forming the birefringent sheet or screen may be discontinuous, i. e., birefringent material may be applied to an isotropic supporting base, or sections of birefringent materials may be provided in an opaque screen, or other modifications may be employed, all without departing from the scope of the invention.

A further light-polarizing element 30 is preferably positioned between the birefringent element 26 and an observer so as to intercept rays emanating from the source 22 and traversing the elements 10 and 26. The polarizer 30 may be positioned with its polarizing axis shown generally by the arrow 32 in any desired position, preferably, however, at an angle to, and neither parallel nor perpendicular to the principal optical axes of the birefringent material 26 and 28.

With such a device the illumination of the lamp 22, resulting in a rising current of heated air and rotation of the element 10, causes a change in the direction of vibration of the polarized light traversing the element and incident upon the birefringent material 26. If this material is viewed through the polarizing element 30, a definite color characteristic is imparted to the beam, and this color characteristic changes continuously as a result of the change of direction of vibration of the light beam incident upon the element 26. A strikingly effective, inexpensive, and readily operated display device is thus made available.

The device here described in its simplest form may be modified in any of the ways heretofore known to the art in connection with heat rotor devices employed in display work, and such modifications are to be deemed to fall within the invention. As an example, reference may be had to the patent to Laxer No. 1,888,861 for apparatus for producing moving picture effects, dated November 22, 1932. The present invention is admirably adapted for use in connection with the optical system there described, and the display results achieved are striking and brilliant.

In devices embodying the present invention, the light source 22 is preferably positioned substantially upon the axis about which the element 10 rotates. If the light source 22 is an incandescent bulb, for example a frosted incandescent bulb, it may be considered as providing a light source of relatively large area. With such a source, the preferred and usual source employed in devices of the type here under discussion, the form of shield or screen heretofore described as produced from the blank 10 is such that light emanating from the source and traversing various portions of the shield or screen between the source and an observer appears to vibrate parallel to light traversing other portions of the screen between the source and the same observer. This will be understood from an examination of Figs. 2 and 3. In each position it is seen that the direction of orientation of the polarizing axes of the needles within the material forming the blank 10 is such that the orientation appears uniform over substantially the entire area of the shield visible from the position of the observer in Fig. 2, and also from the position of the observer in Fig. 3. As a result the entire beam emanating from the source 22 and propagated toward an observer appears to vibrate in the same direction. Hence the color characteristics of the design formed in the birefringent material 26 may be maintained uniform over the entire area of the design and may change gradually and simultaneously over the entire area of the design.

A modification of the invention is shown in Fig. 5. Here birefringent material 34 has been superimposed upon and bonded to the polarizing sheet 10, so that the blank comprises a plurality of elements, one a light-polarizing element, the other a birefringent sheet. It will be apparent that the birefringent sheet may be of a size and shape coinciding exactly with the polarizing element, or it may cover only portions of the polarizing element and may be formed into any predetermined design. Preferably it is so positioned with respect to the polarizing element that one of its principal optical axes 36 is neither parallel nor perpendicular to the polarizing axis 12 of the sheet 10.

Where the blank shown in Fig. 5 is employed, the device may comprise additional birefringent elements, such as the element 26, or it may comprise merely the rotor, the light source and the viewing polarizer 30.

Moreover, for a simple form of the device, the birefringent elements may be disregarded and the display may comprise merely the rotating frusto-conical polarizing element, the light source and the viewing polarizer, in which case the source would appear to grow brighter and dimmer as the element 10 is rotated.

It will be apparent, moreover, that the rotating element may comprise, if desired, sections of light-polarizing material positioned between sections of clear material so that as the device rotates the colors in the design appear, change color, and then disappear. All such modifications of the invention are deemed to fall within the scope thereof.

A still further modification of the invention is shown in Fig. 7. Here the light source 72 is surrounded by a cylindrical sleeve of light-polarizing material 74 with its polarizing axis inclined in any direction and indicated generally by the arrow 76. The sleeve may be supported to rotate about the source with the rotor vanes 78, or it may be fixedly positioned. It serves, in either event, as a chimney to increase the effect on the vanes of the rising column of heated air from the source. With such a structure light emanating from the source is uniformly polarized irrespective of its direction of propagation.

Around the polarizing sleeve and mounted for rotation with the rotor vanes there may be provided a birefringent frusto-conical element 80 which may preferably be a one-half wave retardation device formed from a sheet of one-half wave set plastic material, such as Cellophane, in the manner described in connection with the polarizing shield of Figs. 1, 2 and 3. The arrows 82 may indicate the direction of a principal optical axis of the sheet 80. Rotation of such a device about the light source results in a rotation of the plane of polarization of the transmitted polarized beam through an angle of 360° for each rotation of the element 80.

The device shown in Fig. 7 may advantageously be modified by using in place of sheet 80 a compound sheet of the type shown in Fig. 5, comprising polarizing material and birefringent material. In forming a shield from such a sheet, it should be noted that the birefringent layer should be positioned between the polarizing layer and cylindrical polarizing sleeve 74. That is to say, the birefringent material should be on the inside of the conical shield. Such a device will have the advantage of being operative as a complete unit, with the rotation of shield 80 producing a constant relative change between the axes of the birefringent material and conical polarizer and the polarizing axis of shield 74. It is to be understood that other birefringent and fractional wave retardation sheets may be employed in similar manner without departing from the invention.

In Fig. 6 there is shown a still further modification of the invention. Here the light source 90 is surrounded with a fixedly positioned polarizing element 92 of the shape and possessing the characteristics of the device shown in Fig. 2. The polarizing axes may be deemed represented by the arrows 94. With such a device the light emitted from the source is constantly polarized to vibrate in a predetermined direction which differs slightly but noticeably in every direction through an angle of 180° from the source.

Such a device is useful in light-houses and similar direction-indicating beacons. An observer viewing the source through a suitably calibrated analyzer may set the polarizing axis 102 thereof to the position of extinction and read off his position from a predetermined base line 104 on the scale 106. Since the extinction position may be determined with great accuracy the position of the observer may be quickly plotted. Fig. 6 illustrates at A and B two different positions of an observer and the readings obtained therefrom.

It will be apparent that many modifications of the invention may be employed. For example, where the invention is employed in a display device the light source may be surrounded by two rotating conical devices, an inner polarizer and an outer birefringent device, and these devices may rotate in opposite directions. This may be readily accomplished by the use of a plurality of rotor vane assemblies.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A frusto-conical light polarizer, the polarizing axis of said polarizer along one of the two lines of intersection of any plane intersecting said polarizer and containing the axis of the cone of which said polarizer is a section being perpendicular to the polarizing axis of said polarizer along the other said line of intersection of said plane and said polarizer, the polarizing axis of said polarizer shifting continuously and progressively through an angle of 180 degrees along each edge of said polarizer with one complete circumference thereof.

2. A frusto-conical light-polarizer, the polarizing axis of said polarizer along one of the two lines of intersection of any plane intersecting said polarizer and containing the axis of the cone of which said polarizer is a section being perpendicular to the polarizing axis of said polarizer along the other said line of intersection of said plane and said polarizer, the polarizing axis of said polarizer shifting continuously and progressively through an angle of 180 degrees along each edge of said polarizer with one complete circumference thereof, said polarizer comprising light-transmitting plastic material containing oriented light-polarizing particles.

3. A frusto-conical light polarizer, the polarizing axis of said polarizer along one of the two lines of intersection of any plane intersecting said polarizer and containing the axis of the cone of which said polarizer is a section being perpendicular to the polarizing axis of said polarizer along the other said line of intersection of said plane and said polarizer, the polarizing axis of said polarizer shifting continuously and progressively through an angle of 180 degrees along each edge of said polarizer with one complete circumference thereof, said polarizer having bonded thereto a layer of birefringent material, a principal optical direction of said birefringent material making an acute angle with the polarizing axis of said polarizer.

4. A device of the character described comprising, in combination, a light source, a frusto-conical light polarizer encompassing said source, means for rotating said polarizer about said source, the polarizing axis of said polarizer along one of the two lines of intersection of any plane intersecting said polarizer and containing the axis of the cone of which said polarizer is a section being perpendicular to the polarizing axis of said polarizer along the other said line of intersection of said plane and said polarizer, the polarizing axis of said polarizer shifting continuously and progressively through an angle of 180 degrees along each edge of said polarizer with one complete circumference thereof, and a second light-polarizing element positioned to intercept light emanating from said source and traversing said first-mentioned polarizer.

5. A device of the character described comprising, in combination, a light source, a frusto-conical light polarizer encompassing said source, means for rotating said polarizer about said source, the polarizing axis of said polarizer along one of the two lines of intersection of any plane intersecting said polarizer and containing the axis of the cone of which said polarizer is a section being perpendicular to the polarizing axis of said polarizer along the other said line of intersection of said plane and said polarizer, the polarizing axis of said polarizer shifting continuously and progressively through an angle of 180 degrees along each edge of said polarizer with one complete circumference thereof, a second light-polarizing element positioned to intercept light emanating from said source and traversing said first-mentioned polarizer, and birefringent means positioned between said polarizing elements.

6. A device of the character described comprising, in combination, a light source, a frusto-conical light polarizer encompassing said source, means for rotating said polarizer about said source, the polarizing axis of said polarizer along one of the two lines of intersection of any plane intersecting said polarizer and containing the axis of the cone of which said polarizer is a section being perpendicular to the polarizing axis of said polarizer along the other said line of intersection of said plane and said polarizer, the polarizing axis of said polarizer shifting continuously and progressively through an angle of 180 degrees along each edge of said polarizer with one complete circumference thereof, a second light-polarizing element positioned to intercept light emanating from said source and traversing said first-mentioned polarizer, and birefringent means positioned between said polarizing elements and being mounted for rotation with said frusto-conical polarizer and having a principal optical direction positioned at an acute angle with the polarizing axis thereof.

7. A device of the character described comprising, in combination, a light source, a frusto-conical light polarizer encompassing said source, means for rotating said polarizer about said source, the polarizing axis of said polarizer along one of the two lines of intersection of any plane intersecting said polarizer and containing the axis of the cone of which said polarizer is a section being perpendicular to the polarizing axis of said polarizer along the other said line of intersection of said plane and said polarizer, the polarizing axis of said polarizer shifting continuously and progressively through an angle of 180 degrees along each edge of said polarizer with one complete circumference thereof, and a second light-polarizing element positioned to intercept light emanating from said source and traversing said first-mentioned polarizer, said second light-polarizing element being cylindrical and surrounding said source and being positioned between it and said frusto-conical polarizer.

RANDOLPH K. MARTIN.